| United States Patent [19] | [11] | 4,453,099 |
|---|---|---|
| Flat | [45] | Jun. 5, 1984 |

[54] SUBMERSIBLE MOTOR BEARING WITH EXTENDED SLEEVE

[75] Inventor: Bill D. Flat, Owasso, Okla.

[73] Assignee: Hughes Tool Company, Houston, Tex.

[21] Appl. No.: 341,959

[22] Filed: Jan. 22, 1982

[51] Int. Cl.³ .................... H02K 5/16; F04D 13/08
[52] U.S. Cl. .................................... 310/87; 310/90; 417/365
[58] Field of Search ............... 310/87, 90; 384/275, 384/280, 281, 420, 425, 427; 308/DIG. 4; 417/365

[56] References Cited

U.S. PATENT DOCUMENTS

| 2,767,033 | 10/1956 | Wright | 308/DIG. 4 |
| 2,781,464 | 2/1957 | Timms | 310/90 |
| 3,136,905 | 6/1964 | Zapf et al. | 310/87 |
| 3,484,633 | 12/1969 | Stecher | 310/87 |
| 3,506,861 | 4/1970 | Boyd | 310/90 |
| 3,550,975 | 12/1970 | Boyd | 308/237 |
| 4,119,874 | 10/1978 | Beavers et al. | 310/90 |
| 4,329,122 | 5/1982 | Owada et al. | 310/87 |

Primary Examiner—J. D. Miller
Assistant Examiner—D. L. Rebsch
Attorney, Agent, or Firm—Robert A. Felsman; James E. Bradley

[57] ABSTRACT

A submersible pump electrical motor has a rotor that is divided into sections, and a bearing located between each of the sections for maintaining the shaft of the rotor in axial alignment. The bearing assembly includes a sleeve that is keyed to the shaft. A bearing has an inner portion that rotatably receives the sleeve. The bearing has a flange with a periphery that frictionally engages the stator to prevent the bearing from rotating. The sleeve physically contacts the adjacent rotor sections and transmits forces between them. Washers are located between upper and lower edges of the bearing inner portion for supporting the bearing. The washers have inner diameters that receive the sleeve, and do not carry the weight of any rotor sections located above.

3 Claims, 2 Drawing Figures

SUBMERSIBLE MOTOR BEARING WITH EXTENDED SLEEVE

BACKGROUND OF THE INVENTION

This invention relates in general to electrical motors for submersible pumps, and in particular to a bearing for maintaining the shaft of the rotor in alignment.

High volume wells, such as for oil or water production often use a submersible pump. The pump is a centrifugal pump having a submersible motor that rotates a shaft to drive the pump. Often the motors have several hundred horsepower and are from 6 to 60 feet in length. Each motor has a stator secured within a tubular housing. A rotor secured to a shaft rotates within the stator.

Because of the long length, the rotor is made up of a number of sections. Each section comprises a large number of flat disks (laminations) secured by copper rods. The sections are spaced apart from each other, and a bearing is located between each section for maintaining the shaft in axial alignment. The rotor sections are keyed to the shaft for rotation therewith, but are axially movable with respect to the shaft.

Each bearing assembly includes a sleeve keyed to the shaft for rotation therewith. A bearing has a bore for rotatably receiving the sleeve. The bearing has a periphery that frictionally engages the inner wall of the stator at operating temperatures to prevent the bearing from rotating. In the prior art, the sleeve length is approximately 1/16 an inch greater than the bearing length. An upper thrust washer is carried between the bottom of a rotor section and the upper edges of the sleeve and bearing. A lower thrust washer is carried between the lower edges of the sleeve and bearing and the lower rotor section. The thrust washer thus carries and transmits any force being exerted from one rotor section to the next rotor section. In large motors, the combination of the weight of the rotor sections above each bearing and high operating temperatures may cause the thrust washer to eventually deform. This may cause the bearing to spin with the rotor, possibly damaging the stator inner wall.

SUMMARY OF THE INVENTION

In this invention, a submersible pump electrical motor is provided with a bearing assembly between each rotor section that locates the thrust washer so that it will not at any time be required to support the weight of the rotor sections above it. The sleeve that is keyed to the shaft is extended so that it contacts the rotor sections above and below and transmits any forces between the rotor sections. The bore of the bearing has a lesser length than the sleeve. A washer is located on an upper edge of the bearing, and another washer is located on a lower edge of the bearing. The washers separate the bearing from the rotor sections above and below it. The inner diameter of each washer receives the sleeve. The length of the sleeve is slightly greater than the total length of the washers and bearing bore. The washers do not carry the weight of any rotor sections located above.

DESCRIPTION OF THE PREFERRED EMBODIMENT

Figure 1:
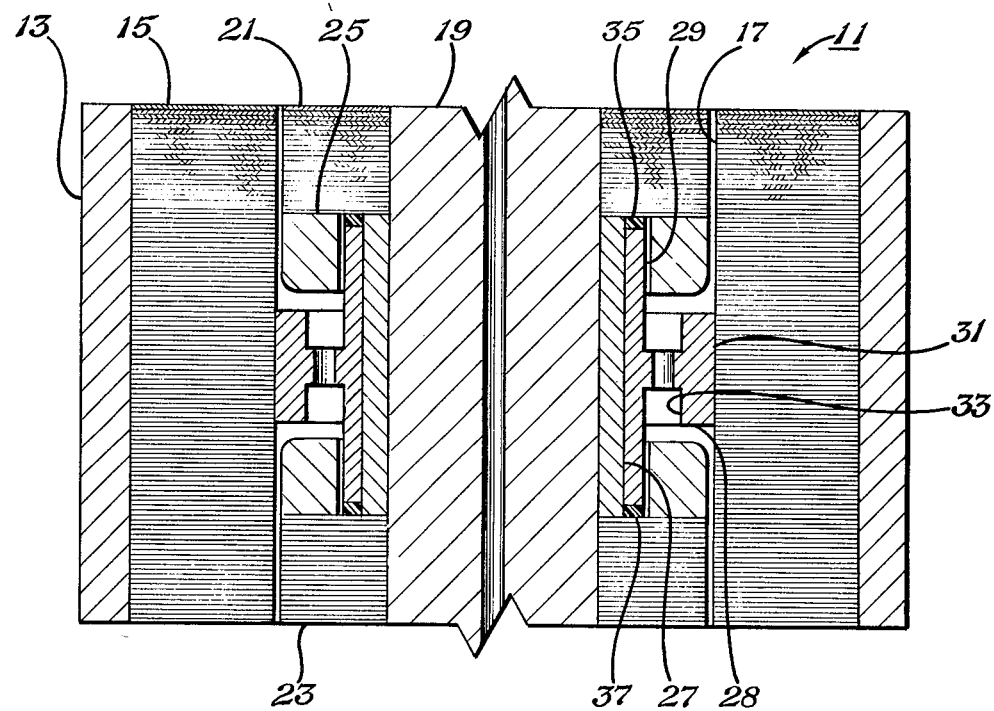
FIG. 1 is a sectional view of a portion of a motor constructed in accordance with this invention.

Referring to FIG. 1, motor 11 includes a cylindrical housing 13. A stator 15 is rigidly mounted within the housing 13. Stator 15 is made up of a large number of flat disks called laminations having slots through which wires (not shown) are wound in a conventional manner. Stator 15 has a cylindrical inner wall 17 that is of uniform constant diameter.

A rotor is rotatably mounted within the inner wall 17 of stator 15. The rotor comprises a shaft 19 and a large number of laminations. The laminations are divided into identical rotor sections approximately 15 inches in length, of which a portion of two of the sections are shown, and identified herein as upper rotor section 21 and lower rotor section 23. Each rotor section 21 and 23 is secured by copper rods (not shown), with copper end rings 25 on each end. The ends of the copper rods are brazed or mechanically welded to the end rings 25 to hold the laminations in each rotor section 21 and 23 together. Each rotor section 21 and 23 is secured by a key (not shown) to shaft 19 for rotation therewith. The rotor sections 21 and 23 are not individually axially locked to shaft 19. However, lowermost rotor section 23 at the end of shaft 19 is axially locked to support the rotor sections with respect to the shaft 19.

Figure 2:
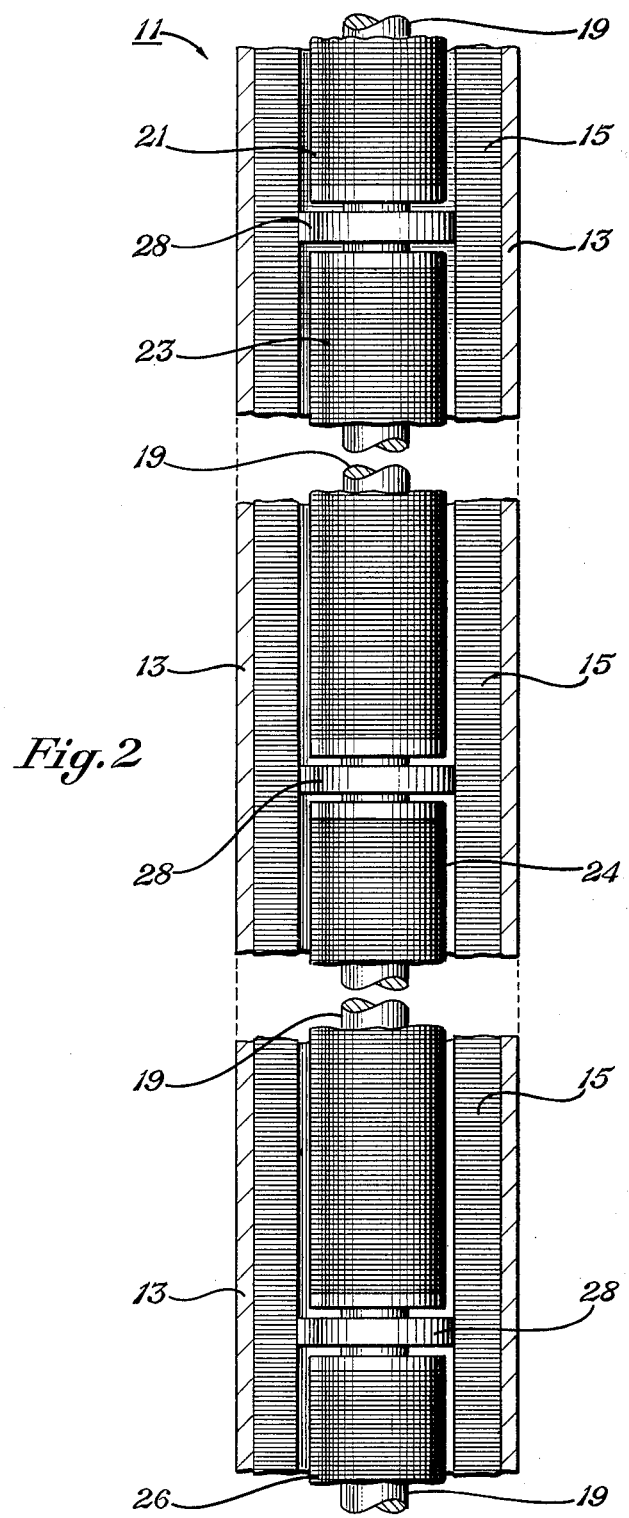
FIG. 2 is a view of several rotors on a shaft.

As shown in FIG. 2, a bearing assembly is located between each of the rotor sections 21 and 23. The bearing assembly includes a sleeve 27 that is keyed to shaft 19 for rotation therewith, but not individually locked axially to shaft 19. Sleeve 27 is preferably a bronze cylinder. The upper edge or circular rim of sleeve 27 contacts the lowermost lamination of the upper rotor section 21. The lower edge of sleeve 27 contacts the uppermost lamination of the lower rotor section 23. Sleeve 27 supports the weight of the rotor sections 21 and 23, and transmits any force between rotor section 21 to the other rotor section 23. Sleeve 27 is carried within an inner bore of ring 25.

A bearing 28 has an inner or cylindrical portion 29 that is also carried within the inner bore of each end ring 25. Inner portion 29 has a bore that rotatably receives the outer wall of sleeve 27. Bearing 28 has an outer portion which is an annular flange 31 with a cylindrical periphery that frictionally engages the inner wall 17 of stator 15 under operating temperatures. This prevents bearing 28 from rotating with respect to stator 15. Flange 31 has a plurality of passages 33 extending through it for allowing lubricating oil to pass. Bearing flange 31 has a length that is less than the distance between the two adjacent end rings 25. The length of the inner portion 29 of bearing 28 is less than the length of sleeve 27. Bearing 28 is preferably of a material harder than bronze, such as nitrolloy.

An upper washer 35 is carried between the upper edge of the bearing inner portion 29 and the lowermost lamination of the upper rotor section 21. Washer 35 has an inner diameter that closely receives the sleeve 27. The outer diameter of thrust washer 35 is the same or slightly greater than the outer diameter of the inner portion 29 of bearing 28. A lower washer 37, identical to washer 35, is located between the lower edge of the bearing inner portion 29 and the uppermost lamination of the rotor section 23. Washer 37 also has an inner diameter that closely receives sleeve 27, and an outer diameter that is equal to or slightly greater than the diameter of the bearing inner portion 29. Washers 35 are preferably of a nonmetallic material, such as a glass reinforced phenolic material. The distance from the lower side of washer 37 to the upper side of thrust washer 35 is about 1/32 inch less than the height of the sleeve 27. This prevents the washers 35 and 37 from bearing the weight of the rotor sections above rotor section 23.

During assembly, a first rotor section 21 or 23 is slid over the shaft 19 and placed against a locking means at one end of the shaft. Then a sleeve 27 is slid over shaft 19 and placed into contact with the first rotor section 21 or 23. Bearing 28 is placed over sleeve 27, with one washer 35 or 37 in contact with the first rotor section. Then a second rotor section 21 or 23 is slid over shaft 19 and placed in contact with sleeve 27, with a washer located between bearing inner portion 29 and the rotor section. The process is repeated until the full length of the rotor assembly is achieved. The last rotor section and sleeve are locked to the shaft 19 to prevent axial movement of the rotor sections with respect to the shaft. The rotor assembly is then slid into inner wall 17 of stator 15 and suspended in the motor by a thrust bearing (not shown).

In operation, current from an uphole power source is supplied to the windings of stator 15. This current causes the shaft 19 to rotate, and along with it each sleeve 27. Slight frictional engagement of the bearing flange 31 with stator inner wall 17 will prevent bearing 28 from rotating at start up. Once the motor begins to warm up, bearing flange 31 will expand outward and frictionally engage the stator 15 with greater force, further preventing rotation. The sleeve 27 will rotate within the bore of the bearing inner portion 29. The washers 35 and 37 will prevent sliding contact of the bearing cylindrical portion 29 with either rotor section 21 and 23. The washers 35 and 37 may rotate with shaft 19, or may remain stationary with bearing 28.

The weight of the rotor sections above each sleeve 27 will be transmitted by the sleeve 27 to rotor sections below. As the motor begins to heat up, the shaft may grow or enlarged longitudinally. The growth is in a downward direction, and any force being exerted from the upper rotor section 21 to the lower rotor section 23 will be transmitted by sleeve 27. During growth, the upper washer 35 may experience some compressive force due to the frictional engagement of the bearing flange 31 with the stator 15. This may cause the upper washer 35 to rotate with the shaft 19, however this is not detrimental if the compressive force is not too great.

The invention has significant advantages. Placing the bearing sleeve in a position so that it supports the adjacent rotor sections allows the washers to be removed from much of the load that would normally be imposed on the thrust washers. This increases the life of the washers, by reducing the tendency to decompose under pressure and temperature. The invention also reduces the chance for the bearing to begin to spin with the rotor.

While the invention has been shown in only one of its forms, it should be apparent to those skilled in the art that it is not so limited but is susceptible to various changes and modifications without departing from the spirit of the invention.

I claim:

1. In a submersible pump motor having a shaft with spaced-apart rotor sections rotated within a stator, and an annular bearing having an inner portion between adjacent rotor sections, both ends separated from the rotor sections by washers, and a periphery that engages the stator, the improvement comprising:
   sleeve means mounted to the shaft for rotation therewith and received rotatably within an inner portion of the bearings, the sleeve means having edges on its opposite ends that contact adjacent rotor sections for supporting the weight of rotor sections above the sleeve, the length of the bearing inner portion, including said washers, being less than the length of the sleeve to prevent the weight of rotor sections above the bearing from being transmitted to the bearing.

2. In a submersible pump motor having a shaft with at least one upper rotor section spaced above a lower rotor section and rotated within a stator, an improved bearing means located between the rotor sections for supporting the shaft in axial alignment, comprising in combination:
   a sleeve mounted to the shaft for rotation therewith and having upper and lower edges in contact with the upper and lower rotor sections, respectively;
   a bearing having an inner bore that rotatably receives the sleeve in sliding contact and a periphery that engages the stator to cause the bearing to remain stationary; and
   a pair of washers, one located between an upper edge of the bearing inner portion and the upper rotor section, the other located between a lower edge of the bearing inner portion and the lower rotor section, each washer having an inner diameter that receives the sleeve;
   the length of the bearing inner portion, including the washers, being no greater than the length of the sleeve to transmit weight of rotor sections above the bearing through the sleeve to rotor sections below the bearing, and to prevent weight of rotor sections above the bearing from being transmitted to the bearing.

3. In a submersible pump motor having a shaft with at least one upper rotor section spaced above a lower rotor section, the rotor sections being slidably carried and rotated by the shaft within a stator, an improved bearing means located between the rotor sections for supporting the shaft in axial alignment, comprising in combination:
   a sleeve mounted to the shaft for rotation therewith and having upper and lower edges in contact with the upper and lower rotor sections, respectively;
   a bearing having an inner portion that rotatably receives the sleeve in sliding contact and having gripping means for engaging the stator to cause the bearing to remain stationary; and
   an upper washer located between an upper edge of the bearing inner portion and the upper rotor section, and a lower washer located between the lower edge of the bearing inner portion and the lower rotor section, each washing having an inner diameter that receives the sleeve;
   the length of the sleeve being slightly greater than the distance from the lower surface of the lower washer to the upper surface of the upper washer to transmit vertical thrust on the rotor sections through the sleeve, and to prevent vertical thrust on the rotor sections from being transmitted to the bearing.

* * * * *

UNITED STATES PATENT OFFICE
CERTIFICATE OF CORRECTION

Patent No. 4,453,099　　　　　　Dated June 5, 1984

Inventor(s) BILL D. FLATT

It is certified that error appears in the above-identified patent and that said Letters Patent are hereby corrected as shown below:

On title page of patent, inventor's name "Flat" should be spelled -- Flatt --.

Signed and Sealed this

Seventeenth Day of September 1985

[SEAL]

Attest:

DONALD J. QUIGG

Attesting Officer

Commissioner of Patents and Trademarks—Designate